US00RE44188E

(19) United States
(12) Reissued Patent
Adra

(10) Patent Number: US RE44,188 E
(45) Date of Reissued Patent: Apr. 30, 2013

(54) SYSTEM AND METHOD FOR DYNAMICALLY SIMULATING PROCESS AND VALUE STREAM MAPS

(75) Inventor: Hosni I. Adra, Naperville, IL (US)

(73) Assignee: CreateASoft, Inc., Aurora, IL (US)

(21) Appl. No.: 13/024,202

(22) Filed: Feb. 9, 2011

Related U.S. Patent Documents

Reissue of:
(64) Patent No.: 7,489,976
Issued: Feb. 10, 2009
Appl. No.: 11/225,708
Filed: Sep. 12, 2005

(51) Int. Cl.
*G05B 13/02* (2006.01)
*G06F 7/60* (2006.01)

(52) U.S. Cl.
USPC ..... 700/29; 703/2

(58) Field of Classification Search ..... 700/2–3, 700/8–9, 11, 18, 20, 23, 29, 86, 99; 703/2, 703/6, 13
See application file for complete search history.

(56) References Cited

U.S. PATENT DOCUMENTS 3,648,035 A * 3/1972 Hart et al. ..... 700/34
4,827,423 A * 5/1989 Beasley et al. ..... 700/96
5,229,948 A * 7/1993 Wei et al. ..... 700/99
5,301,320 A * 4/1994 McAtee et al. ..... 705/7.13
5,321,605 A * 6/1994 Chapman et al. ..... 705/7.22
5,452,218 A * 9/1995 Tucker et al. ..... 700/110
5,544,348 A * 8/1996 Umeda et al. ..... 703/17
6,184,048 B1 * 2/2001 Ramon ..... 438/14
6,405,157 B1 * 6/2002 Fujii et al. ..... 703/2
6,631,305 B2 * 10/2003 Newmark ..... 700/110
6,816,747 B2 * 11/2004 Mammoser et al. ..... 700/109
6,975,915 B2 * 12/2005 Robitaille et al. ..... 700/108
6,993,492 B2 * 1/2006 George et al. ..... 705/7.31
7,006,878 B2 * 2/2006 Schweizerhof et al. ..... 700/51
7,065,493 B1 * 6/2006 Homsi ..... 705/7.26
7,162,427 B1 * 1/2007 Myrick et al. ..... 705/348
7,236,844 B1 * 6/2007 Bai et al. ..... 700/100
7,599,755 B2 * 10/2009 Adra ..... 700/108
2005/0234766 A1 * 10/2005 Shuker ..... 705/10
2006/0085237 A1 * 4/2006 Shuker et al. ..... 705/7
2006/0242005 A1 * 10/2006 Rodrigue et al. ..... 705/11

* cited by examiner

*Primary Examiner* — Ramesh Patel
(74) *Attorney, Agent, or Firm* — Klintworth & Rozenblat IP LLC

(57) ABSTRACT

A computer readable medium comprising instructions which when executed by a computer system causes the computer to implement a method for dynamically improving a process flow is provided. For a plurality of cells, which define activities within the process flow and are characterized by a corresponding plurality of productivity data elements, the method triggers a state engine to simulate the process flow, with the state engine configured to manage all operations rules related to the process flow, and determines at least one process improvement. The method further identifies productivity data elements that correspond to the at least one process improvement, and dynamically modifies the identified productivity data elements to improve the process flow.

53 Claims, 7 Drawing Sheets

SYSTEM AND METHOD FOR DYNAMICALLY SIMULATING PROCESS AND VALUE STREAM MAPS

Matter enclosed in heavy brackets [ ] appears in the original patent but forms no part of this reissue specification; matter printed in italics indicates the additions made by reissue.

FIELD

The present embodiments relate, in general, to process flows and, more particularly, to a system and method for dynamically simulating process and value stream maps.

BACKGROUND

With today's emphasis on "lean implementation" in business environments, manufacturing and service, companies seek to acquire tools that effectively identify problems affecting productivity and update work-in-progress process flows with newly inserted tasks. A basic philosophy of the lean implementation into a process flow is to target inefficiency and to improve economical goals, which is accomplished by focusing on determining production times that meet or exceed customer requirements. Initiatives of lean implementations typically begin with a development of a value stream map of an operation. However, the value stream map does not take into consideration a dynamic aspect of the operation and a product mix that may be in production at different times.

Six Sigma is a method, based on standard deviations, used to analyze and identify variations in process flows to provide productivity improvements. As such, some companies have integrated aspects of the six-sigma and lean tools to improve productivity in the manufacturing and service environments. However, when process map studies and simulations are required due to changes in process constraints, further off-line actions have to be undertaken such as building, verifying and validating simulation models for experimentation of improvements. These actions thus lack a dynamic aspect of integrations or modifications in model simulations.

Accordingly, a system and method is desired that can integrate and combine varied analytical and implementation tools to dynamically build, simulate and analyze processes subjected to any applicable conditions and scenarios to provide productivity improvements.

BRIEF SUMMARY

The present invention is defined by the appended claims. This description summarizes some aspects of the present embodiments and should not be used to limit the claims.

A computer readable medium comprising instructions which when executed by a computer system causes the computer to implement a method for dynamically improving a process flow is provided. For a plurality of cells, which define activities within the process flow and are characterized by a corresponding plurality of productivity parameters, the method triggers a state engine to simulate the process flow, with the state engine configured to manage all operations rules related to the process flow, and determines at least one process improvement. The method further identifies productivity parameters that correspond to the at least one process improvement, and dynamically modifies the identified productivity parameters to improve the process flow.

A computer readable medium comprising instructions which when executed by a computer system causes the computer to implement a method for creating a dynamic value stream map is provided. For a plurality of cells defining activities within the process flow and characterized by a corresponding plurality of productivity parameters, the method identifies value stream metrics, which corresponding to the plurality of cells and to interrelationships between the plurality of cells. The method further triggers a state engine to simulate the value stream map, the state engine configured to manage all operations rules related to the value stream map, and dynamically update the value stream metrics during the simulation of the value stream map and analyze a value stream map performance.

Figure 1:
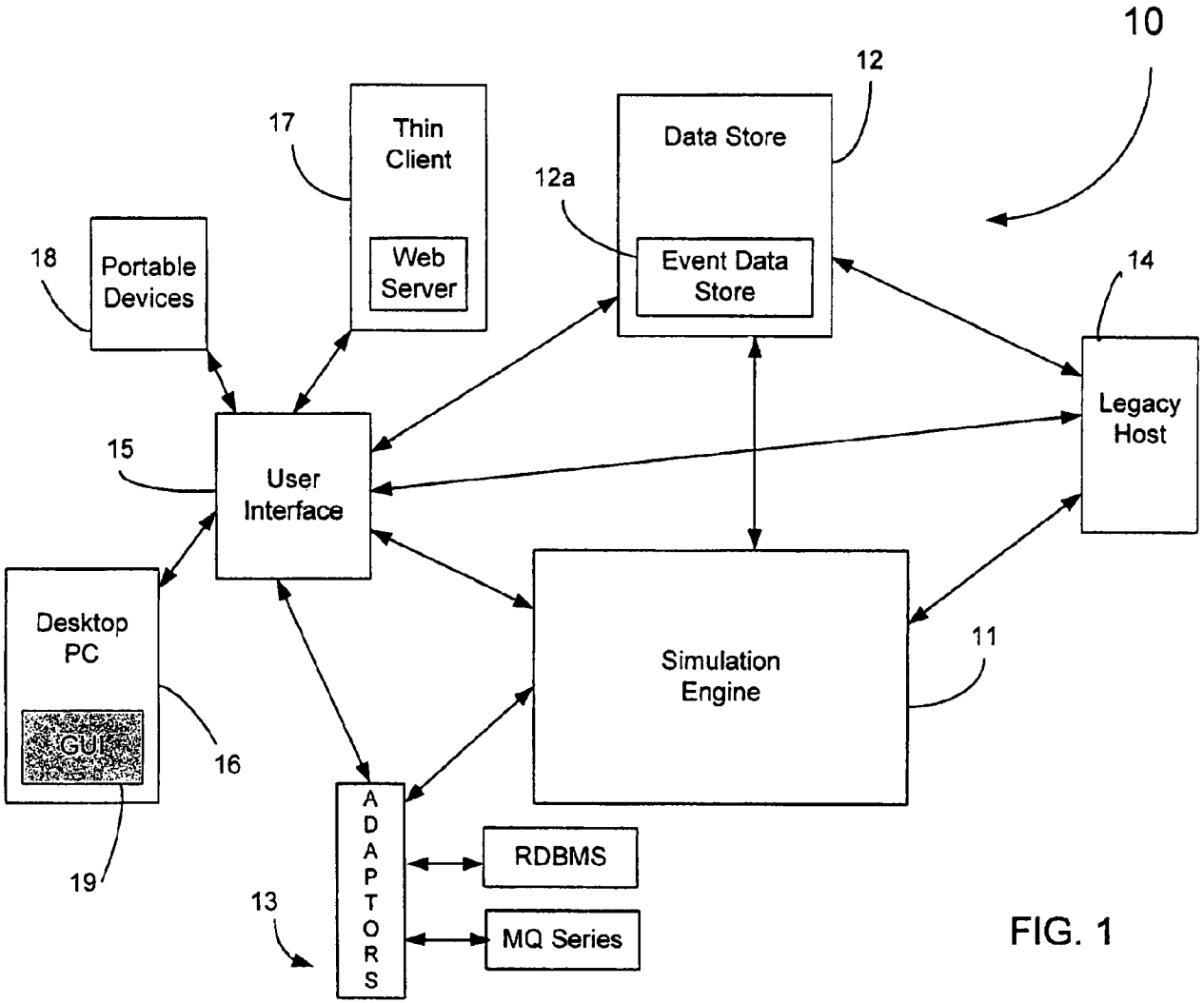
FIG. 1 illustrates a functional diagram of a process simulation system in accordance with the invention.

Illustrative and exemplary embodiments of the invention are described in further detail below with reference to and in conjunction with the figures.

In the drawings, identical reference numbers identify identical or substantially similar elements or acts. To easily identify the discussion of any particular element or act, the most significant digit or digits in a reference number refer to the Figure number in which that element is first introduced.

A portion of this disclosure contains material to which a claim for copyright is made. The copyright owner has no objection to the facsimile reproduction by anyone of the patent document or the patent disclosure (including Figures), as it appears in the Patent and Trademark Office patent file or records, but reserves all other copyright rights whatsoever.

DETAILED DESCRIPTION OF THE DRAWINGS

The present invention is defined by the appended claims. This description summarizes some aspects of the present embodiments and should not be used to limit the claims.

While the present invention may be embodied in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a and an" object is intended to denote also one of a possible plurality of such objects.

Turning now to the drawings, and particularly to FIG. 1, a functional diagram of a process simulation system embodying the principles of the present invention is illustrated and generally designated at 10. In the present process simulation system 10, a simulation or state engine 11 communicates with a data store 12, data access adaptors 13 to exchange both internal and external data, respectively, and a Legacy host 14 that includes or interfaces with external applications.

With regard to a user presentation, simulation system 10 includes a user interface to display and manage data, provide static and dynamic views of process flows, and control simulation runs. The user interface 15 is connected to the simulation engine 11 to initiate, pause and terminate simulation runs, and to the data store 12 to upload and update process model data. The user interface 15 can reside on or be connected to desktop and portable PC options 16, thin clients 17 via web servers, and portable devices 18 via wireless networks.

The data store 12 represents a working area for data transfers between components of the simulation model. The data store 12 restores data to the simulation engine 11 directly or via an event data store 12a, while the later externalizes it back. A record of each operation or activity completed during a simulation run by the simulation engine 11 may be stored in the data store 12, thereby providing a complete audit trail of all essential operations or activities performed during simulation runs.

The event data store 12a represents a working area for data storage and transfers during simulation runtime. This event data store 12a can be a relational database, which passes to and receives data from the simulation engine 11, the user interface 15 and other components of the simulation system. Alternately, the event data store 12a may reside independently of the data store 12, while remaining coupled to each other.

Functionally, the simulation engine 11 manages all the rules related to a process flow during a corresponding simulation run. Moreover, any rule changes made via the user interface 15, data store 12 or external interfaces (Legacy Host) 14 are automatically captured and implemented by the simulation engine 11 during a simulation run. Once a simulation run is stopped or cancelled, the simulation engine 11 may no longer be aware of the process flow until another simulation trigger occurs. The simulation engine 11 supports global process operations inclusive of accessing data, and managing that data for access by individual components or applications. Simulations of the process flow can represent simple and complex operations, whose metadata are defined by corresponding rules by which the simulation engine 11 will execute them.

Functionally, the simulation engine 11 is triggered to begin a process flow simulation. The rules of operations of the process flow are cached upon startup or a first execution of the process flow and represent the life of the process flow. Thereafter, the simulation engine 11 performs a flow of operations until it encounters a task or trigger that requests the process flow to pause, terminate or resume with altered rules of operations. These rules of operations include parameters or variables of cells and interrelationships between these cells that define activities within the process flow. For the sake of simplicity, hereafter the simulation system 10 will be referred to as a simulation tool, and components of the simulation system 10 will be individually discussed when appropriate.

In manufacturing, production, business or office systems, workpieces, people or goods flow through stages or cells that may be separated by transportation transitions (carriers) or storage spaces for temporary storage, referred to herein as buffers. Each cell comprises one or more cell operations, a robotically or computer generated task, or a task performed by human operation such as assembly or machining. Buffers can be either parallel or crossover. The crossover type is capable of storing and cross-feeding workpieces from any upstream cell to any downstream cell, and the parallel type can only store and feed workpieces from a single designated upstream cell to designated downstream cells. Since each cell has its own cycle time, frequency of machine breakdown, and time required to repair, and each buffer has its own capacity, the flow of the system can be interrupted, starved, or blocked by any mismatches between cells.

One problem is to improve a performance of such a system, but this performance is governed by a combination of interrelations between cells and buffers, which are characterized by respective parameters. Modifying one cell or one buffer without considering the existing interrelationship to the other cells or buffers may lead to minimum or no improvement in performance. Thus, the targeted solution lies in finding a dynamic approach to determine a combination of cell and buffer parameters under which the system meets a desired performance. Some of these parameters are, of course, more controllable than others. So the degree of design freedom of the system may be limited and constraints may exist even on the controllable parameters.

As such, a thorough understanding of the behavior of the system can be acquired by creating an accurate process model that reflects the activities of the cells, and of the buffers. A simulation of the process model provides a process map, which is generically a hierarchical procedure for displaying and illustrating how a product or transaction is processed. The process map comprises a stream of cell activities that transforms an input or a set of inputs into a pre-determined set of outputs, and provides an understanding of the interaction of activities and causes during the process flow. Thus, a dynamic process map may be used to determine a combination of parameters under which the process flow of the system is modified to reach the targeted or best possible performance.

Given a manufacturing, production, business or office process, and using the simulation tool 10, a model of the process is initially built or configured with stored data of cells, buffers, resources and other related entities based on a determined initial or current state of the process. Alternately, the process model may be configured based on a user entry, via the user interface 15, while defining respective location of the cells, buffers, including their respective activities and parameters, as well as related resources and entities. The respective location of the cells and buffers in the process model may substantially determine a routing of the manufactured objects or workpieces through the model. Alternately, the process model may be automatically built and configured based on routing tables or other flow definition methods. The routing tables may be accessed or retrieved from the data store 12 or from external applications 14. Thus, the building or configuration of the process model may be executed or performed without any software coding created internally by the simulation tool or externally by the user. Once configured, the process model is loaded to the data store 12 as the default model for the process.

Figure 2:
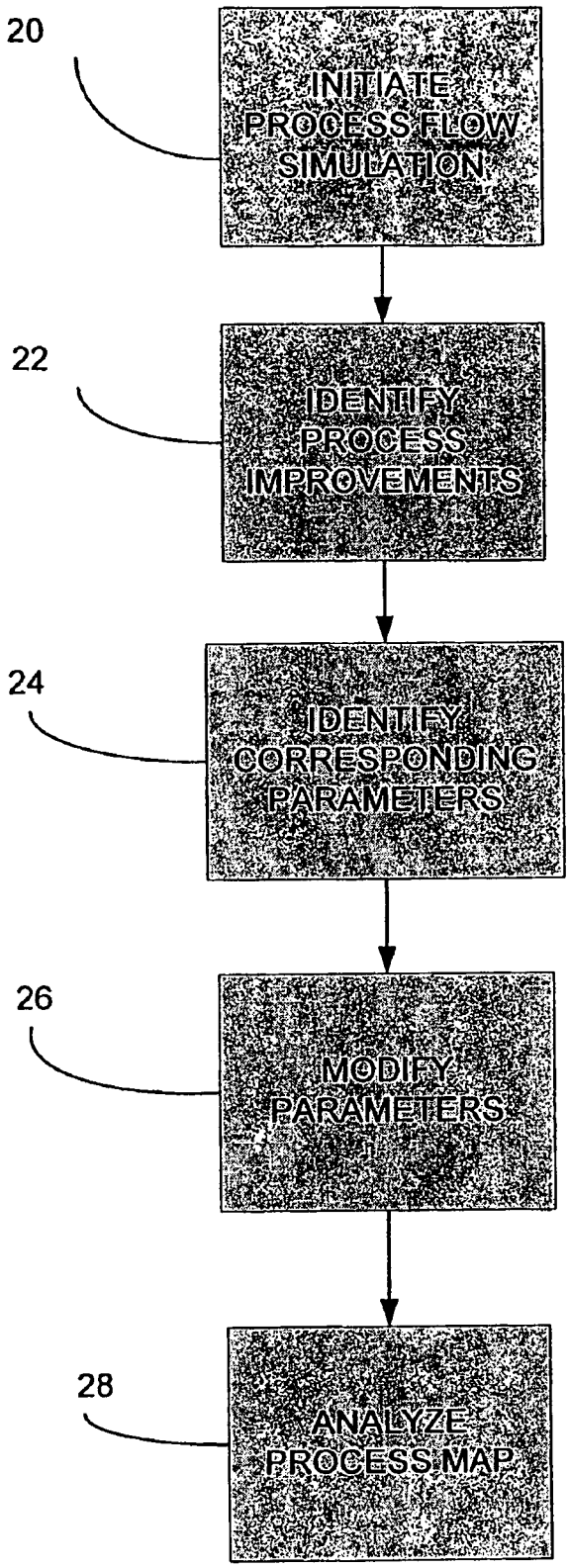
FIG. 2 is a flow chart illustrating a method for dynamically improving a process flow.

In FIG. 2, a flow chart illustrates a method for dynamically improving a process flow. To simulate the process flow, the simulation engine 11 is triggered via the user interface 11 or external events, at step 20. Subsequently, the simulation engine 11 acquires or caches all the rules related to the process flow from the data store and other contributing components of the simulation model. During the simulation, the simulation engine 11 provides run time data to the user interface 15 to display dynamically the resulting process map, and to the event data store 12 for storage and tracking purposes. Accordingly, the process map may animate and display custom and simulation properties of the objects, resources, and other entities dynamically during the simulation run, and at the end of the simulation run.

During this simulation run, the user may wish to determine an improvement to the process flow to mitigate a problem with one or several of the cells or buffers, for example, or to play "what if" scenarios, at step 22. Based on the dynamic display of the process map or on report, the user may identify productivity parameters that correspond to the problem or the "what if" scenario, at step 24. The user may then modify at least one of the identified parameters on the fly while the simulation progresses, at step 26. Such parameter modification is recognized dynamically by the simulation tool 10, and the modified parameters are incorporated in the event data store 11 for the remainder of the simulation or until the next parameter modification. The dynamic incorporation of the modified parameters enable the simulation tool 10 to provide a corresponding dynamic process map to be evaluated and analyzed by the user, at step 28. Every modification or change of the process model, such as parameter or resource modifications, is captured as a departure from the current version of the process model, and the simulation tool 10 dynamically designates or uses the new version of the process model to produce dynamically a corresponding process map. As such, the simulation tool 10 can track and record a history of changes done to the process model.

Further, as departures from the current version of the process model are stored and used to produce corresponding process maps, the simulation tool 10 can simulate, and analyze multiple scenarios simultaneously. Additionally, the simulation tool 10 can be configured to modify the current simulation run in order to mitigate a simulation-run violation of limits or thresholds imposed on the parameters, for example, or to improve and optimize the process performance. The simulation tool 10 can further dynamically change routing, selection, cycle times, and all other constraints and properties during the simulation run based on predetermined conditions, scenarios related to scheduling of resources, and so forth.

The process improvement may relate to mitigating a bottleneck, a delay, a scheduling problem, or reducing operating costs. The process improvement may also correspond to a new routing of the process flow, cycle times of each of the plurality of cells, input resources, and output requirements of the process flow.

In regard to routing of the process flow, the simulation tool 10 can also import or load external routing tables from external applications 14 dynamically and update the routing of objects, resources, and other entities based on the imported routing table. The imported routing table can further be changed dynamically during the simulation run by the user or by external applications 14. The modified routing can be reloaded or re-synchronized with the process model with direct impact on the on-going simulation run. Moreover, the simulation tool 10 can dynamically interface with an external application 14 and export or import data at any time during the simulation run. In addition to imported routing tables, the imported data can represent modified parameters, new cells, and so forth.

Just as each cell comprises one or more cell operations within the process model, the cell may further comprise a plurality of sub-cells, and a process flow of these sub-cells may also represent a corresponding subprocess of the process. These sub-cells thus determine corresponding activities within the sub-processes, and are characterized by a plurality of productivity sub-parameters. As such, in order to improve or modify the cell performance, the user may wish to determine an improvement to the sub-process flow by mitigating a problem with one or several of the sub-cells or sub-buffers, for example, or to play "what if" scenarios at the sub-cell layer. Based on the dynamic display of the sub-process map, the user may identify productivity sub-parameters that correspond to the problem or the "what if" scenario. The user may then modify at least one of the identified sub-parameters on the fly while the simulation progresses. Such sub-parameter modification is recognized dynamically by the simulation tool 10, and the modified sub-parameters are incorporated in the event data store for the remainder of the simulation. Every modification or change of the sub-process model, such as sub-parameter or resource modifications, is captured as a departure from the current version of the sub-process model, and the simulation tool 10 dynamically designates or uses the new version of the sub-process model to produce dynamically a corresponding sub-process map. As such, the simulation tool 10 can track and record a history of changes done to the sub-process model.

As sub-processes may determine a layering of the process model, the process model can be layered, hierarchically or otherwise, so as to include or contain a number of layers that may be interconnected. These layers may represent sub-process models relating to cells of the process model, or multiple process models linked to one another through process links. These process links may be buffers, common cells, or other connecting process models. In this layered arrangement, the process map can be simulated for the overall process model, for an individual or multiple sub-processes (layers, for example) simultaneously.

In addition to the process flow, a static value stream encompasses all the steps (both value added and non-value added) in the process that helps bring a product (object or workpiece) or service through the process flow and essential to producing the product or service. A value stream map enables an understanding of flow of information as products or services make their way through the value stream. The value stream map is typically configured to gather and display a broad range of information, and is used at a broad level, i.e. from the receiving of raw material to the delivery of finished products. The value stream map may be used to identify where to focus future projects, subprojects, and/or Kaizan events. Thus, the value stream map takes into account not only the activity or journey of the product or service, but also the management and information systems that support the process flow. These characteristics of the value stream map are substantially helpful to gain insight into potential efficiency improvements in addition to the process flow, thereby helpful when aiming to reduce cell cycle time for example.

However, the value stream map does not take into consideration a dynamic aspect of the process flow or operation and a product mix that may be in production at different times. As such, a dynamic value stream mapping is provided to simulate, analyze and evaluate the value stream when subjected to any applicable conditions and scenarios.

As discussed above in regard to the process mapping, given a manufacturing, production, business or office process, and using the simulation tool 10, a model of the process is initially built or configured with data of cells, buffers, resources and other related entities, such as value stream metrics corresponding to the cells and to interrelationships between the cells.

For each of the cells in the process, the corresponding value stream metrics can represent value added time (VAT), non-VAT, efficiency, takt time, objects completed, objects in progress, capacity, downtime, set-up and change over, load time, unload time, buffer size, lead time, and so forth.

Figure 3:
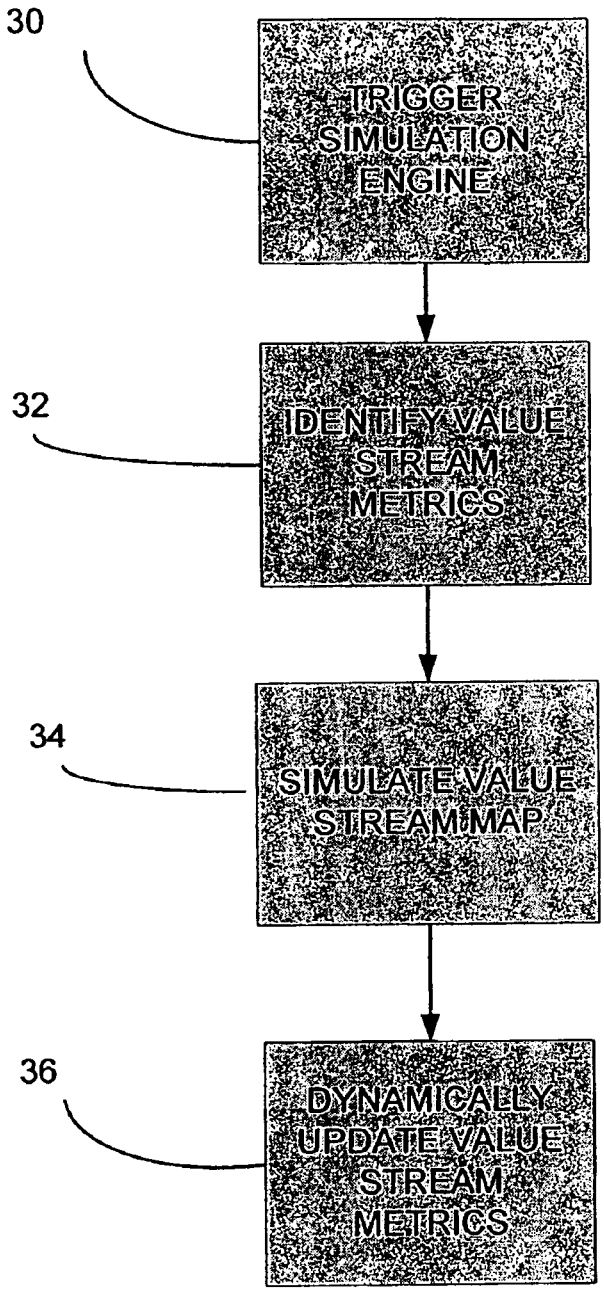
FIG. 3 is a flow chart illustrating a method for dynamically creating a value stream map.

In FIG. 3, a flow chart illustrates a method for dynamically creating a value stream map. To create a dynamic value stream map, the simulation engine is triggered via the user interface 15 or by external events, at step 30. At the start or during this simulation run, the user may wish to identify or select all or a subset of the available value stream metrics that correspond to the cells of the process flow and to interrelationships between these cells, at step 32. During the simulation of the value stream map, at step 34, the selected value stream metrics are evaluated and dynamically updated at step 36, thereby creating the dynamic value stream mapping.

Moreover, in order to analyze and evaluate the value stream when subjected to any applicable conditions and "what if" scenarios, the user may identify a set of corresponding value stream metrics. The user or external applications 14 may then modify at least one of the corresponding value stream metrics on the fly while the simulation progresses. Such value stream metric modification is recognized dynamically by the simulation tool 10, and the modified value stream metrics are incorporated in the event data store for the remainder of the simulation or until the next value metrics modification. Every modification or change of the value stream metrics is captured as a departure from the current version of the value stream, and the simulation tool 10 dynamically designates or uses the new version of the value stream to create dynamically a corresponding value stream map. As such, the simulation tool 10 can track and record a history of states of the value stream maps.

Further, as different versions, departures from the current version, of the value stream are stored and used to produce corresponding value stream maps, and the simulation tool 10 can simulate simultaneously these different value stream maps.

As stated earlier, cells may include sub-cells that determine activities within corresponding sub-processes, and are characterized by a plurality of productivity sub-parameters. In addition, value stream metrics may be identified that correspond to the sub-cells and to interrelationships between the sub-cells. During the simulation, selected value stream metrics of the sub-cells or interrelationship between the sub-cells are evaluated and dynamically updated, thereby creating the corresponding dynamic value stream mapping.

Moreover, due the potential layered arrangement of the process model, the dynamic value stream map can be simulated for the overall process model, for an individual or for multiple sub-processes (layers, for example) simultaneously.

Due the dynamic importation and exportation of data, routing tables and value stream metrics of cells, for example, prior to or during a process simulation, the value stream map may be useful to predict or forecast future value stream maps. Such imported value stream metrics may correspond to work in progress (WIP) or forecasted data. The simulated value stream map may dynamically detect future potential bottlenecks, delays, and scheduling problems.

This dynamic value stream map can validate change within the Lean constraints. Further, based on the interaction between the value stream maps, minimum requirements may be set for the Six Sigma initiatives.

As the simulation engine 11 manages all the rules related to the process flow during a corresponding simulation run, and supports the simulation of the dynamic process map, and the static and dynamic value stream maps, all of the data used and produced by the simulation engine 10 can be provided dynamically and interactively between their respective simulations.

As discussed above, the process model may be configured and built based on a user entry, via the user interface of the simulation tool, while defining respective location of the cells, buffers, including their respective activities, parameters, and value stream metrics, as well as related resources and entities. As shown in FIG. 1, the user interface 15 communicates directly to the simulation engine 10. With that, a user using a graphical interface 19 can build the process model.

Figure 4:
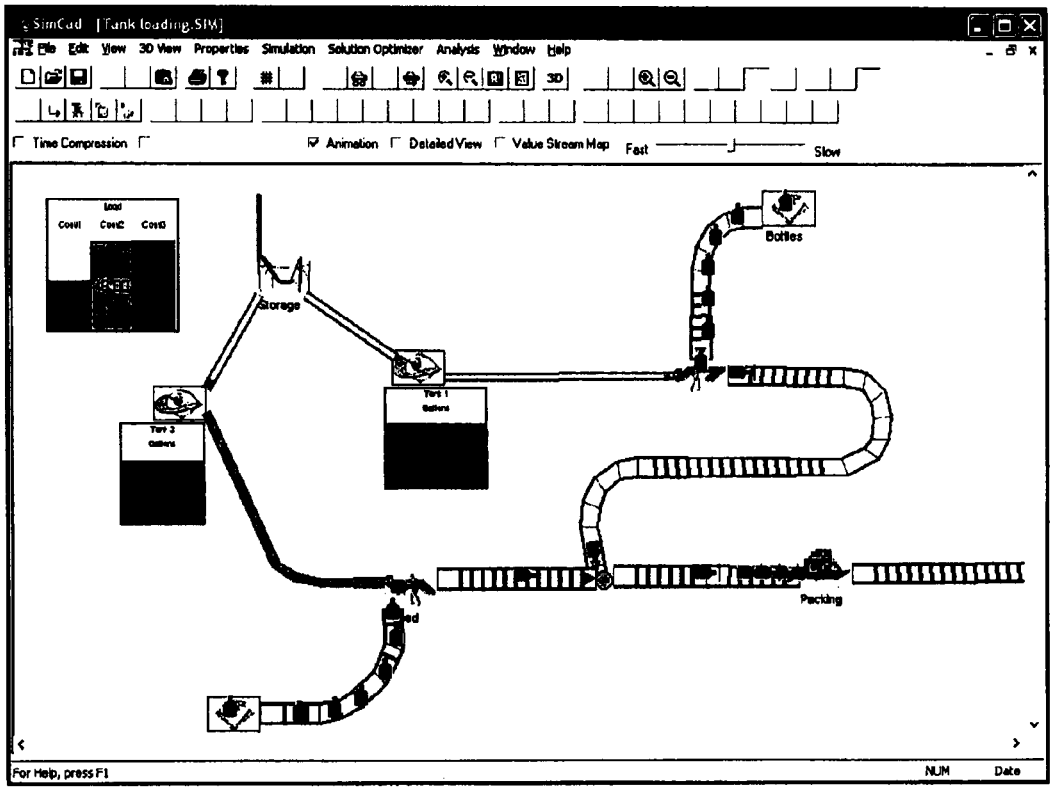
FIG. 4 is a graphical display illustrating a simulation of a process map.

Graphically, the user can determine process graphic units (cells, objects, and the like) to be monitored or controlled and a layout of the process, which may be imported from a CAD layout, then create flow connectors (buffers and the like) between the cells to determine directions and constraints (buffers) of the process flow. To represent the process units and connectors, stored graphical icons can be retrieved from the data store 12, or customized icons can be imported. Alternately, the simulation tool 10 can enable the user to interface to visual basic (VB) scripts or code for additional model customization, as shown in FIG. 4.

Once the process model is built, the user can add, graphically or via data import, other process constraints or parameters, such as cycle times, resource requirements, change over, mean time between failures (MTBF) and mean time between repairs (MTBR), and so forth, to the process. In a situation, where the user does not determine or set some constraints or parameters, the simulation tool 10 can define default values for these constraints and parameters. All graphical units and connectors created are dynamically communicated, along with their constraints and parameters, to the simulation engine 11, and subsequently to the data store 12 to be available to other components of the simulation tool 10. Additionally, any process model, in part or in whole, can be copied and pasted onto any another process model. Such graphical actions on and between the process models preserves all properties of the copied, and pasted process model parts. Further, since model processes can include a number of layers that may or may not be interconnected. These layers may represent sub-process models relating to cells of the process model, or multiple process models linked to one another through process links. If a layer needs to be duplicated in the same model or across different process models, this layer may be copied or pasted as one unit in the same model or across different models.

After starting or triggering a simulation run, all animations of the process are generated by the simulation tool 10 and provided dynamically to the graphical interface 19 via the user interface 15. These animations correspond to the behavior or progress of the cells, objects, buffers, as well as data, during the simulation run. As such, the simulation tool 10 can generate and provide via graphical interface 19 a path for every object, resource, or any traveling entity, during the simulation run and identify lean values (non-value added time, value added time, transition time, processing time, and others) per object, path, and flows.

Since the simulation engine 10 is in communication with the event data store 11 during the simulation run, the user can request a display in real time of any statistical data relating to the process, connections, or objects, as well as a graph of any tracked statistical data as it changes through time during the simulation run and after the simulation run completes. The user can also request analysis reports detailing potential problems in the simulated model based on the predetermined constraints. Information reports, that detail the process model properties, are configured to contain links to dynamically modify unit or connection properties without the need to switch to the graphical model. The reports, statistical and informational, may be customized by the user, and generated during or after the simulation to be used as guides to help improve and optimize the flow.

In support of the dynamic process and value stream maps discussed above, the user can graphically modify the simulation model during the simulation run, and make changes to the routing of the process, cycle times, resource requirements, and all other constraints and properties of the model. The user can trigger a pause to the simulation run, then resume without any resetting or loss of the data. However, the user can initiate the data collection and analysis to be reset as many times as needed during the simulation run while maintaining the model behavior and object and resource positions.

The user may simulate the process flow by triggering the simulation engine from the graphical interface 19. During the simulation, the simulation tool 10 provides run time data to display dynamically the resulting process map. Accordingly, the process map is graphically animated displaying custom and simulation properties of the objects, resources, and other entities dynamically during the simulation run, and at the end of the simulation run.

During this simulation run and using the dynamic display of the process map, the user may identify productivity parameters that correspond to a process problem or to "what if" scenarios. The user may then recall or highlight to modify at least one of the identified parameters on the fly while the simulation progresses. Such parameter modification is recognized dynamically by the simulation tool 10, and the modified parameters are incorporated in the event data store 19 for the remainder of the simulation. Since every modification or change of the process model is captured as a departure from the current version of the process model, the user may opt to simultaneously simulate more than one dynamic process map, and display them simultaneously on the graphical interface. As such, the user can run several versions or scenarios of the process for educational and analytical comparisons.

Figure 5:
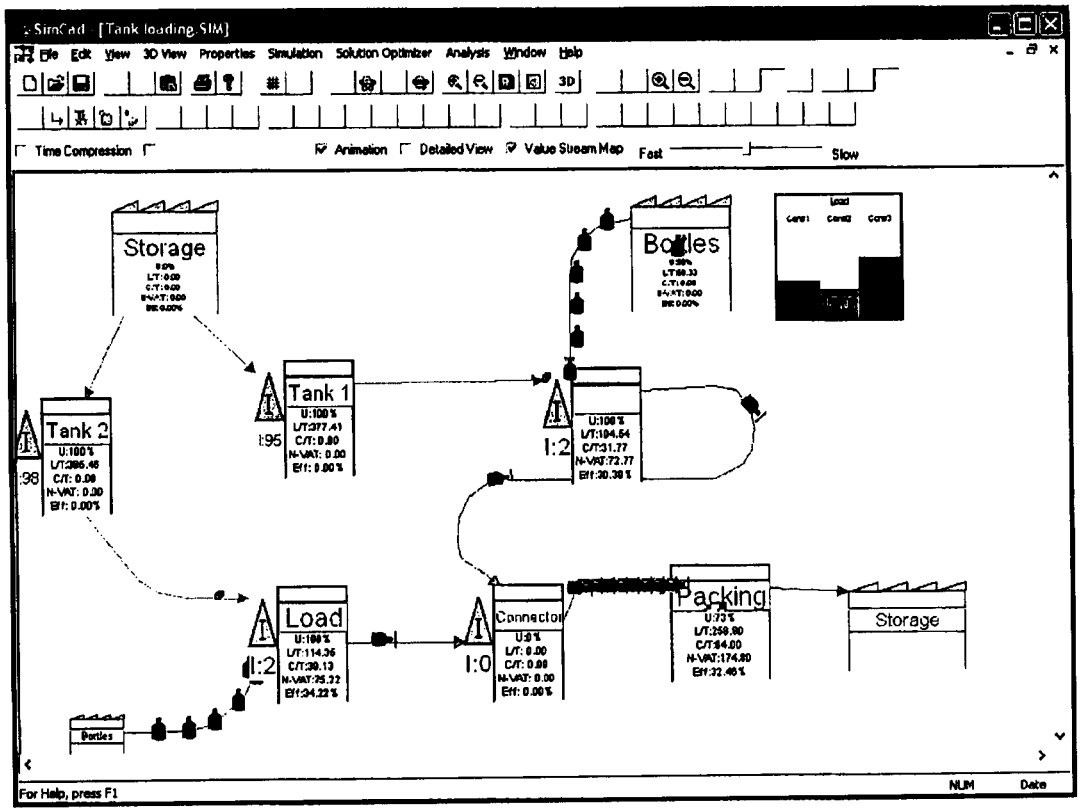
FIG. 5 is a graphical display illustrating a value stream map corresponding to the process map of FIG. 4.

Similarly, the user can create dynamic value stream maps of the process by dynamically modifying or altering targeted value stream metrics. As such, a number of versions or scenarios of value stream maps can be simultaneously simulated as well as displayed graphically. The value stream map can be overlaid over a graphical layout of the process, as an image file or a CAD drawing, as shown in FIG. 5. The dynamic value stream is updated in real-time based on the simulation progress and the updates are displayed on the CAD layout or image file. Moreover, the process map and value stream map can be hierarchically layered where each map may contain a number of layers. As such, the user may opt to select for viewing and tracking any combination of layers of both the process and value stream maps.

As discussed above, dynamic process and value stream maps are configured to exchange data during the simulation run. Accordingly, the user may benefit from creating a dynamic process map to view and analyze the resulting impact on the corresponding value stream map. Vice-versa, by creating a dynamic value stream map, the user can view and analyze the resulting impact on the dynamic process map.

As mentioned above, the simulation tool 10 can include data connectivity to desktop and portable personal computers 16, as well as to thin clients 18 via web servers and to portable devices 17 via wireless networks. Thus, the user may dynamically import real time data to track operations within an on-going process in a number of ways. The imported data can originate via updates from external databases, files, radio frequency identification (RFID) devices, and global positioning (GPS) devices, among others.

The tracking can be applied or performed on objects, resources, carriers, and all animated entities within the simulation data. Tracking data may be used to perform predictability and forecasting analysis on the process to show the future state of the process and how it might progress through time. Each tracked product or object can be queried for position, history, and statistical data during the tracking and/or simulation and forecasting data. As the simulation tool 10 feeds dynamically all run time data to the user interface 15, the tracking can be displayed or animated in real time at a substantially exact location of the tracked object on the CAD layout or image file with proper scaling. The tracking data and corresponding analysis can be stored for later retrieval/replay of the process. The collected tracked data can be used as an initial state of the process to simulate the dynamic process map, and create dynamic value stream map to predict problems and provide proactively corresponding remedies or solutions. The statistical data generated by the tracking may be used to generate a corresponding dynamic value stream map.

As stated above, the simulation tool 10 can be connected to portable computers 16, such as PDAs, wireless devices, and wireless notebooks. The real time process data, including and not limited to process properties, model flow, resources, carriers, time studies, and model constraints, can be captured or taken on the field from operations of the process via the portable devices then imported in the simulation tool without the need for a third party software.

The user can export the process model to the PDA, and then walk the corresponding real layout of the process in a plant or an office to input parameters directly onto the PDA 16. The modified or new parameters are then imported into the simulation tool 10, i.e. to the process flow and the process and value stream maps. Once the data is imported, the user may initiate the simulation tool 10 or other appropriate applications to perform time study analysis, flow analysis, and so forth. Alternately, the user may collect real time parameters without having a priori the process model on the portable device.

The graphical interface 19 may also offer three dimensional (3D) views or the process model based on the built or configured 2D process model. The user may display simultaneously both 2D and 3D views of the process or of a selected layer or layers of the process or switch between the two views. Further, the user may display background images or graphics (CAD or image file) in 3D views, and export the 3D views to the 2D views based on the flow settings. Moreover, the user may display the dynamic value stream map in 3D views, dynamically update the content of the value stream map in 3D views, and modify the process map and/or the value stream map in 3D views during the simulation run.

Figure 6:
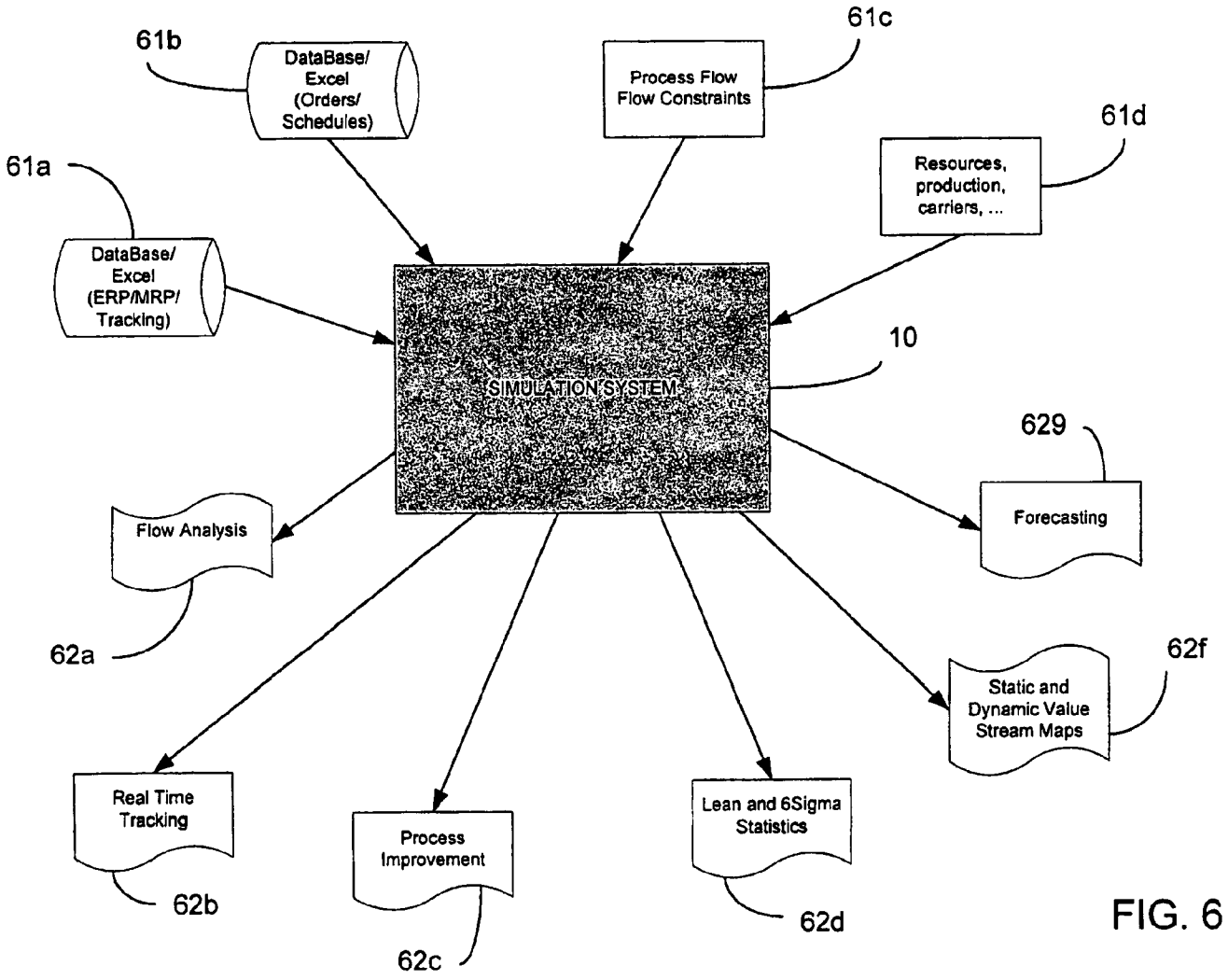
FIG. 6 is a block diagram illustrating the process simulation system of FIG. 1 with a plurality of input data sources and a plurality of output tasks.

In view of the above discussion and as shown in FIG. 6, the proposed simulation system 10 accomplishes imports of process data via a multi-channel data capture sub-system, such as ordering and scheduling databases or Excel sources 61a, enterprise resource planning (ERP) and manufacturing resource planning (MRP) and Tracking databases 61b, process flow and flow constraints 61c, and resources, productions, carriers 61d, and so forth. In return, the simulation system 10 provides a spectrum of analytical, statistical and informative tools, such as flow analysis 62a, real time tracking 62b, process improvement 62c, Lean and Six Sigma statistics 62d, static and dynamic value stream maps 62e, and forecasting 62g.

Figure 7:
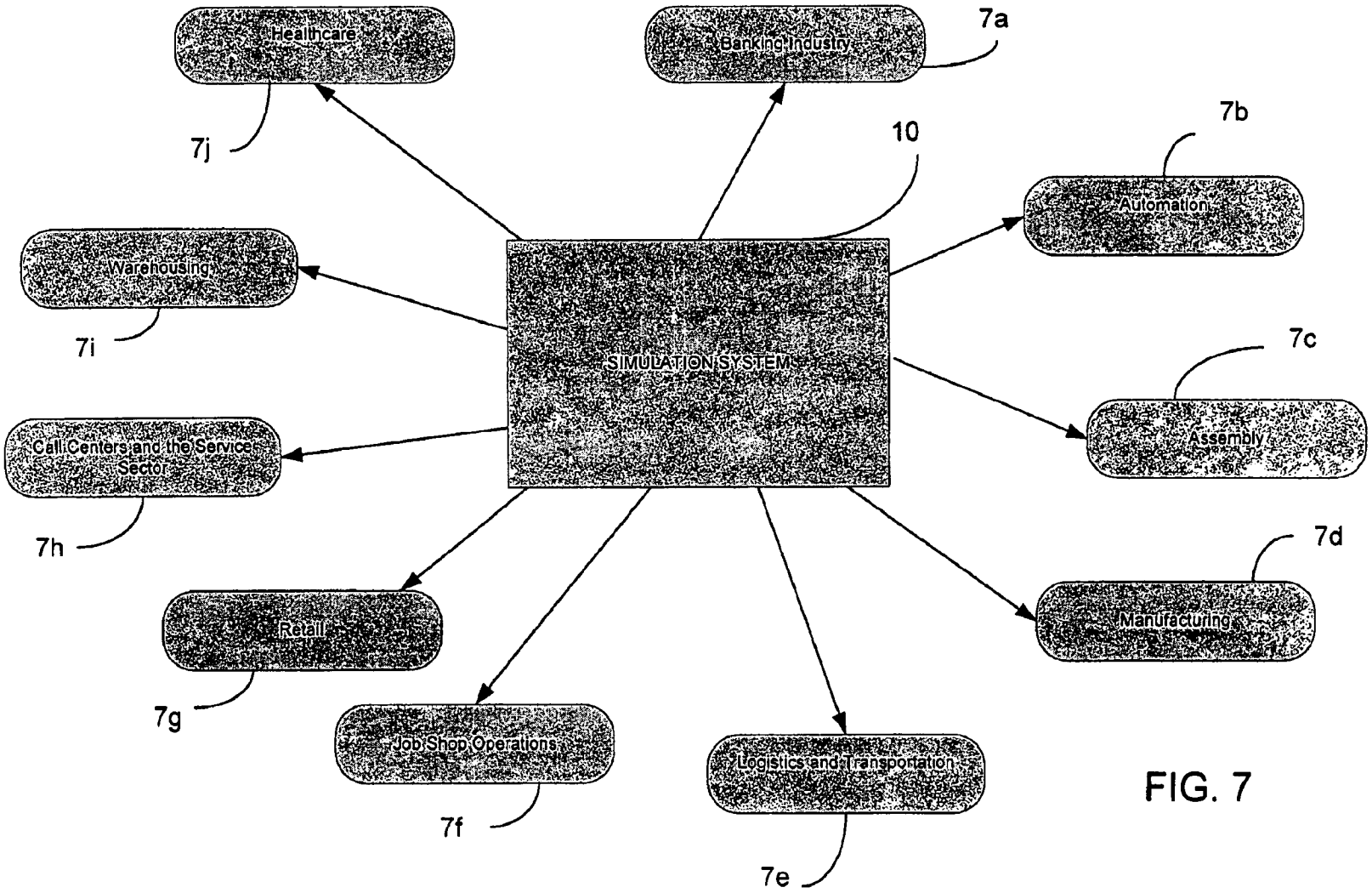
FIG. 7 is a block diagram illustrating potential industry and business applications of the simulation system.

In FIG. 7, a block diagram illustrates an example of the extended business application area offered by the proposed simulation system 10. Such extended business area runs the gamut of process oriented businesses, such as but not limited to banking industry 7a, automation 7b, assembly 7c, manufacturing 7d, logistics and transportation 7e, job shop operations 7f, retail industry 7g, call centers and service industry 7h, warehousing 7i, and healthcare 7j.

It is therefore intended that the foregoing detailed description be regarded as illustrative rather than limiting, and that it be understood that it is the following claims, including all equivalents, that are intended to define the spirit and scope of this invention.

The invention claimed is:

1. A *non-transitory* computer readable medium comprising instructions executed by a computer system to implement a method for dynamically improving a process flow, *the process flow including a plurality of cells and a plurality of buffers connecting the plurality of cells, each of the plurality of cells characterized by a corresponding plurality of productivity parameters,* the method comprising:

[identifying a plurality of cells of the process flow, which are each characterized by a corresponding plurality of productivity parameters;]

triggering a state engine to simulate the process flow, the state engine configured to manage [the plurality of productivity parameters and] *all* operations rules related to the process flow;

determining at least one process improvement;

identifying at least one productivity parameter that corresponds to the at least one process improvement; and

[providing on the fly an adjustment of the at least one identified productivity parameter to the state engine to] dynamically [modify] *modifying* the *at least one identified productivity parameter during the* simulation [of] *to improve* the process flow.

2. The *non-transitory* computer readable medium comprising instructions to implement a method for dynamically modifying a process flow of claim 1, wherein the at least one improvement comprises mitigating a bottleneck, a delay, and/or a scheduling conflict.

3. The *non-transitory* computer readable medium comprising instructions to implement a method for dynamically modifying a process flow of claim 1, wherein the process flow comprises a manufacturing process and the at least one improvement comprises [to] reducing operating costs of the manufacturing process.

4. The *non-transitory* computer readable medium comprising instructions to implement a method for dynamically modifying a process flow of claim 1, wherein the at least one productivity parameter is one of routings of the process flow, cycle times of each of the plurality of cells, input resources, and output requirements of the process flow.

5. The *non-transitory* computer readable medium comprising instructions to implement a method for dynamically modifying a process flow of claim 1, wherein the step of triggering the state engine further comprises:

pausing the state engine at a determined instant;

modifying the identified productivity parameters; and retriggering the state engine.

6. The *non-transitory* computer readable medium comprising instructions to implement a method for dynamically modifying a process flow of claim 1, the method further comprising:

generating custom reports during the simulation of the process flow.

7. The *non-transitory* computer readable medium comprising instructions to implement a method for dynamically modifying a process flow of claim 1, the method further comprising:

communicating simulation data to a graphical user interface; and dynamically displaying simulation data over a graphical representation of the process flow.

8. The *non-transitory* computer readable medium comprising instructions to implement a method for dynamically modifying a process flow of claim 7, wherein the displayed simulation data represents constraints and bottlenecks.

9. The *non-transitory* computer readable medium comprising instructions to implement a method for dynamically modifying a process flow of claim 7, wherein the graphical representation is a three dimensional representation.

10. The *non-transitory* computer readable medium comprising instructions to implement a method for dynamically modifying a process flow of claim 1, the method further comprising:

importing data corresponding to the process flow; and providing on the fly *the* imported data to the state engine to dynamically modify the simulation of the process flow.

11. The *non-transitory* computer readable medium comprising instructions to implement a method for dynamically modifying a process flow of claim 10, wherein the imported data comprises modified productivity parameters.

12. The *non-transitory* computer readable medium comprising instructions to implement a method for dynamically modifying a process flow of claim 10, wherein the imported data comprises at least one new cell.

13. The *non-transitory* computer readable medium comprising instructions to implement a method for dynamically modifying a process flow of claim 10, wherein the imported data comprises modified routing tables of the process flow.

14. The *non-transitory* computer readable medium comprising instructions to implement a method for dynamically modifying a process flow of claim 10, wherein the step of importing data enables forecasting bottlenecks, delays, and/or scheduling problems.

15. The *non-transitory* computer readable medium comprising instructions to implement a method for dynamically modifying a process flow of claim 1, the method further comprising:

dynamically storing simulation data provided by the state engine in a database.

16. The *non-transitory* computer readable medium comprising instructions to implement a method for dynamically modifying a process flow of claim 15, the method further comprising:

dynamically displaying stored simulation data for a post-simulation analysis.

17. The *non-transitory* computer readable medium comprising instructions to implement a method for dynamically modifying a process flow of claim 15, wherein the dynamically stored data enables a tracking of an object navigating the process flow.

18. The *non-transitory* computer readable medium comprising instructions to implement a method for dynamically modifying a process flow of claim 17, wherein the tracking of the object enables a dynamic allocation of the tracked object.

19. The *non-transitory* computer readable medium comprising instructions to implement a method for creating a dynamic value stream map of claim 17, wherein the graphical representation and position of the tracked object is provided dynamically during the simulation.

20. The *non-transitory* computer readable medium comprising instructions to implement a method for creating a dynamic value stream map of claim 17, wherein the graphical representation and position of the tracked object is provided dynamically after the simulation.

21. A *non-transitory* computer readable medium comprising instructions *which when* executed by a computer system

*causes the computer system* to implement a method for dynamically improving a process flow, the method comprising:

identifying a sub-process, the sub-process comprising a plurality of sub-cells, the plurality of sub-cells defining activities within the sub-process flow and characterized by a corresponding plurality of productivity parameters;

triggering a state engine to simulate the sub-process flow, the state engine configured to manage the plurality of productivity parameters and operations rules related to the sub-process flow;

determining at least one sub-process improvement;

identifying [productivity] at least one *productivity* parameter that corresponds to the at least one sub-process improvement; and providing on the fly an adjustment of the at least one identified productivity parameter to the state engine to dynamically modify the simulation of the sub-process flow.

22. A *non-transitory* computer readable medium comprising instructions *which when* executed by a computer system *causes the computer* to implement a method for creating a dynamic value stream map of a process flow, the value stream map represented by a plurality of value stream metrics corresponding to a plurality of cells of the process [and to] *of* interrelationships between the plurality of cells, the method comprising:

triggering a state engine to simulate the value stream map, the state engine configured to manage the plurality of value stream metrics and operations rules related the value stream map;

evaluating the value stream metrics in the state engine during the simulation of the value stream map; and updating on the fly the value stream map with the evaluated value stream metrics to provide a dynamic value stream map.

23. The *non-transitory* computer readable medium comprising instructions to implement a method for creating a dynamic value stream map of claim 22, the method further comprising:

analyzing the dynamically updated value stream metrics to evaluate a performance of the value stream map.

24. The *non-transitory* computer readable medium comprising instructions to implement a method for creating a dynamic value stream map of claim 22, wherein the value stream metrics are at least one of value added time (VAT), non-VAT, efficiency, take time, objects completed, objects in progress, capacity, downtime, set-up and change over, load time, unload time, buffer size, and lead time.

25. The *non-transitory* computer readable medium comprising instructions to implement a method for creating a dynamic value stream map of claim 22, wherein the value stream metrics are customized.

26. The *non-transitory* computer readable medium comprising instructions to implement a method for creating a dynamic value stream map of claim 23, further comprising:

determining at least one dynamic value stream map improvement;

identifying at least one value stream metric that corresponds to the at least one value stream improvement; and providing on the fly an adjustment of the at least one identified value stream metric to the state engine to dynamically modify the simulation of the value stream map.

27. The *non-transitory* computer readable medium comprising instructions to implement a method for creating a dynamic value stream map of claim 22, the method further comprising:

dynamically storing data corresponding to the evaluated value stream metrics in a database.

28. The *non-transitory* computer readable medium comprising instructions to implement a method for creating a dynamic value stream map of claim 27, the method further comprising:

dynamically displaying stored simulation data for a post-simulation analysis.

29. The *non-transitory* computer readable medium comprising instructions to implement a method for creating a dynamic value stream map of claim 22, further comprising:

communicating simulated value stream metrics data to a graphical user interface; and dynamically displaying value stream metrics data over a graphical representation of the value stream map.

30. The *non-transitory* computer readable medium comprising instructions to implement a method for creating a dynamic value stream map of claim 29, wherein the graphical representation is a three dimensional representation.

31. The *non-transitory* computer readable medium comprising instructions to implement a method for creating a dynamic value stream map of claim 22, the method further comprising:

exchanging data between the process flow and the dynamic value stream map.

32. The *non-transitory* computer readable medium comprising instructions to implement a method for creating a dynamic value stream map of claim 22, wherein one of the value stream metrics corresponds to tracking data of an object.

33. The *non-transitory* computer readable medium comprising instructions to implement a method for creating a dynamic value stream map of claim 32, wherein the tracking data enables a dynamic allocation of the tracked object.

34. The *non-transitory* computer readable medium comprising instructions to implement a method for creating a dynamic value stream map of claim 33, wherein a graphical representation and position of the tracked object is provided dynamically during the simulation of the dynamic value stream map.

35. The *non-transitory* computer readable medium comprising instructions to implement a method for creating a dynamic value stream map of claim 34, wherein the graphical representation and position of the tracked object is provided dynamically after the simulation using the corresponding stored data.

36. The *non-transitory* computer readable medium comprising instructions to implement a method for creating a dynamic value stream map of claim 22, the method comprising:

providing on the fly new data corresponding to the value stream metrics to the state engine thereby dynamically modifying the simulation of the value stream map.

37. The *non-transitory* computer readable medium comprising instructions to implement a method for creating a dynamic value stream map of claim 36, wherein the data is provided by external applications.

38. The *non-transitory* computer readable medium comprising instructions to implement a method for creating a dynamic value stream map of claim 36, wherein the provided data corresponds to cell and/or buffer data.

39. The *non-transitory* computer readable medium comprising instructions to implement a method for creating a dynamic value stream map of claim 36, wherein the provided data corresponds to alternate routing tables of the process flow or process definition methods.

40. A *non-transitory* computer readable [medium] comprising instructions executed by a computer system to implement a method for creating a dynamic value stream map of a sub-process flow, the value stream map represented by a plurality of value stream metrics corresponding to a plurality of sub-cells of the process and to interrelationships between the plurality of sub-cells, the method comprising:

triggering a state engine to simulate the value stream map, the state engine configured to manage the plurality of value stream metrics and operations rules related to the value stream map;

dynamically evaluating the value stream metrics in the state engine during the simulation of the value stream map; and updating on the fly the value stream map with the evaluated value stream metrics to provide a dynamic value stream map.

41. The *non-transitory* computer readable medium comprising instructions to implement a method for creating a dynamic value stream map of claim 40, the method further comprising:

analyzing the dynamically evaluated value stream metrics to evaluate a performance of the value stream map.

42. A *non-transitory* computer readable medium comprising instructions executed by a computer system to implement a method for dynamically modifying a flow of a process, the process characterized by a plurality of cells, which are each characterized by a corresponding plurality of productivity parameters, and interrelationships between the plurality of cells, the method comprising:

triggering a state engine to simulate the process flow, the state engine configured to manage the plurality of productivity parameters and operations rules related to the process flow; and providing on the fly process data to the state engine, thereby dynamically modifying the simulation of the process flow.

43. The *non-transitory* computer readable medium comprising instructions to implement a method for dynamically modifying the process flow of claim 42, wherein the provided *process* data is provided by external applications.

44. The *non-transitory* computer readable medium comprising instructions to implement a method for dynamically modifying the process flow of claim 42, wherein the provided *process* data corresponds to cell and/or buffer data.

45. The *non-transitory* computer readable medium comprising instructions to implement a method for dynamically modifying a process flow of claim 42, wherein the provided *process* data corresponds to alternate routing tables of the process flow [process] definition methods.

46. A *non-transitory* computer readable medium comprising instructions *which when* executed by a computer system *causes the computer* to implement a method for dynamically creating a process flow, the method comprising:

triggering a state engine *to simulate the process flow*, the state engine configured to manage [all] operations rules related to the process flow;

providing on the fly process data to the state engine, the process data corresponding to a plurality of cells, which are each characterized by a corresponding plurality of productivity parameters, and interrelationships between the plurality of cells, thereby incorporating the provided *process* data to dynamically create the process flow.

47. The *non-transitory* computer readable medium comprising instructions to implement a method for dynamically creating the process flow of claim 46, wherein the provided *process* data is provided by external applications.

48. The *non-transitory* computer readable medium comprising instructions to implement a method for dynamically creating the process flow of claim 47, wherein the provided *process* data corresponds to cell and/or buffer data.

49. The *non-transitory* computer readable medium comprising instructions to implement a method for dynamically creating a process flow of claim 47, wherein the provided *process* data corresponds to alternate routing tables of the process flow or process definition methods.

50. A *non-transitory* computer readable medium comprising instructions executed by a computer system to implement a method for dynamically creating a value stream map corresponding to a process flow, the value stream map represented by a plurality of value stream metrics corresponding to a plurality of cells of the process and to interrelationships between the plurality of cells, the method comprising:

triggering a state engine to simulate the process flow, the state engine configured to manage operations rules related to the process flow; *and* providing on the fly value metrics data to the state engine, thereby dynamically incorporating the provided data to dynamically create the value stream map.

51. The *non-transitory* computer readable medium comprising instructions to implement a method for dynamically creating the value stream map of claim 50, wherein the provided data is provided by external applications.

52. The *non-transitory* computer readable medium comprising instructions to implement a method for dynamically creating the value stream map of claim 50, wherein the provided data corresponds to cell and/or buffer data.

53. The *non-transitory* computer readable medium comprising instructions to implement a method for dynamically creating the value stream map of claim 50, wherein the provided data corresponds to alternate routing tables of the process flow or process definition methods.

* * * * *